(12) United States Patent
Tsunoda

(10) Patent No.: US 6,945,323 B2
(45) Date of Patent: Sep. 20, 2005

(54) AUTOMOTIVE AIR CONDITIONING SYSTEM

(75) Inventor: Isao Tsunoda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/937,582

(22) Filed: Sep. 8, 2004

(65) Prior Publication Data

US 2005/0051320 A1 Mar. 10, 2005

(30) Foreign Application Priority Data

Sep. 8, 2003 (JP) ........................................ 2003-315771

(51) Int. Cl.⁷ ............................ B60H 1/00; B60H 3/00; F24F 11/00; F25B 29/00
(52) U.S. Cl. ........................... 165/202; 165/42; 165/43; 165/103; 236/13; 236/91 E; 236/91 F; 237/12.3 A; 237/12.3 B; 454/156
(58) Field of Search ............................ 165/202, 42, 43, 165/103; 236/13, 91 E, 91 F; 237/12.3 A, 12.3 B; 454/156

(56) References Cited

U.S. PATENT DOCUMENTS

| | | | | |
|---|---|---|---|---|
| 4,994,958 A | * | 2/1991 | Iida | 165/43 |
| 5,152,335 A | * | 10/1992 | Doi et al. | 165/42 |

FOREIGN PATENT DOCUMENTS

| | | | | |
|---|---|---|---|---|
| JP | A-56-82626 | | 7/1981 | |
| JP | 64085808 A | * | 3/1989 | B60H/1/00 |
| JP | 05201233 A | * | 8/1993 | B60H/1/00 |
| JP | 05278433 A | * | 10/1993 | B60H/1/00 |
| JP | 06270644 A | * | 9/1994 | B60H/1/00 |
| JP | 07156638 A | * | 6/1995 | B60H/1/00 |
| JP | 08258543 A | * | 10/1996 | B60H/1/12 |
| JP | 11254943 A | * | 9/1999 | B60H/1/00 |

* cited by examiner

*Primary Examiner*—John K. Ford
(74) *Attorney, Agent, or Firm*—Hamre, Schumann, Mueller & Larson, P.C.

(57) ABSTRACT

An automotive air conditioning system includes: an air conditioning duct having an outlet; an evaporator; a heater core; an air mix door that divides air passing through the air conditioning duct into to pass through the heater core and to bypass the heater core; an outlet air temperature sensor; a control unit; a primary bypass passageway defined by the air mix door; a secondary bypass passageway different from the primary bypass passageway; and a cold air controlling door that controls an air flow rate in the secondary bypass passageway. The control unit sets an opening for the air mix door to obtain air conditioned to the target outlet air temperature when the cold air controlling door is opened to an initial opening and controls the opening to cause a temperature detected by the outlet air temperature sensor to approach a target outlet air temperature.

5 Claims, 6 Drawing Sheets

AUTOMOTIVE AIR CONDITIONING SYSTEM

BACKGROUND OF THE INVENTION

1. Field of the Invention

The present invention relates to an automotive air conditioning system, and more particularly to an automotive air conditioning system in which an outlet air temperature controlling accuracy is enhanced.

2. Background Art

In vehicles such as passenger cars, an air conditioning system is equipped in order to maintain a temperature environment within a passenger compartment in good condition irrespective of outside air temperature conditions. In the automotive air conditioning system, normally, several outlets are provided in a panel in front of driver and front passenger seats. According to the automotive air conditioning system, an outlet air temperature is controlled appropriately so as to become a target outlet air temperature in order to maintain the temperature inside the passenger compartment to a set optimum temperature. The control of the outlet air temperature is implemented by controlling the opening of an air mix door adapted to be freely opened and closed which is disposed between an evaporator and a heater core which are installed in an air conditioning duct in such a manner as to control a mixing ratio of a hot air (a hot side air) with a cold air (a non-hot side air). The air mix door, which is provided upstream of the heater core, has a function to divide air passing through the interior of the air conditioning duct into the hot-side air and the non-hot side air.

A technique described in a JP-A-56-82626, for example, is known as a technique for controlling with good accuracy the outlet air temperature at an outlet of an automotive air conditioning system to a target outlet air temperature. According to the technique described in JP-A-56-82626, a temperature sensor is provided at the outlet, so that an actual outlet air temperature detected by the temperature sensor is compared with a target outlet air temperature set on a control system, and the opening of the air mix door is controlled so that the actual outlet air temperature approaches the target outlet air temperature.

SUMMARY OF THE INVENTION

As shown in JP-A-56-82626, when the actual outlet air temperature is feedback controlled to the target outlet air temperature by controlling the opening of the air mix door in the automotive air conditioning system, the following problem is expected to be raised.

The temperature of a heater core, which constitutes a hot temperature side, is determined based on the temperature of an engine coolant, and a difference in temperature between the heater core and an evaporator, which constitutes a low temperature side is very large. Namely, the difference in temperature between a cold air sent from the evaporator and a hot air that has passed through and come out of the heater core as a result of the dividing action of the air mix door is large. Due to this, when trying to divide an air passing from the evaporator to the heater core into a hot side air, that is, a hot air and a non-hot side air, that is, a cold air by imparting a change to the opening of the air mix door based on the aforesaid feedback control, a change in the outlet air temperature relative to the change in the opening of the air mix door becomes very large. Namely, since only the amount of air that becomes a hot air by the action of the heater core on a downstream side and the amount of air which is a cold air are determined by the air mix door, an extent of temperature change that can be controlled relative to the target outlet air temperature becomes large, resulting in a rough control. In other words, in the conventional feedback control, air is mainly divided into the hot side air and the non-hot side air only by the air mix door, and a fine temperature control cannot be performed, and hence there has been caused a problem that the outlet air temperature cannot be controlled with good accuracy.

A problem that the invention is to solve is to improve the conventional rough temperature control attributed to the large temperature difference between the hot air and the cold air in the automotive air conditioning system that is configured to control the opening of the air mix door in order for the outlet air temperature to be caused to approach the target outlet air temperature to an accurate temperature control by reducing the extent of temperature change that can be controlled.

In view of the problem mentioned above, an object of the invention is to provide an automotive air conditioning system which can control the temperature of air sent out from an outlet with good accuracy by reducing the extent of temperature change that can be controlled relative to a target outlet air temperature under a configuration in which a feedback control is implemented so that the outlet air temperature at the outlet can be caused to approach the target outlet air temperature.

To attain the object, the invention provides an automotive air conditioning system, including: an air conditioning duct having an outlet; an evaporator that cools air inside the air conditioning duct; a heater core that heats air inside the air conditioning duct; an air mix door that divides air passing through an interior of the air conditioning duct into a hot side air which is made to pass through the heater core and a non-hot side air which is made to bypass the heater core; an outlet air temperature sensor that detects a temperature of air at the outlet; a control unit that is connected to the outlet air temperature sensor; a primary bypass passageway which is defined by the air mix door; a secondary bypass passageway which differs from the primary bypass passageway; and a cold air controlling door that controls a flow rate of air in the secondary bypass passageway. The control unit includes: an air mix door opening setting unit that sets an opening for the air mix door so as to obtain air conditioned to the target outlet air temperature when the cold air controlling door is opened to an initial opening; and a cold air controlling door controlling unit that controls the opening of the cold air controlling door to cause a temperature detected by the outlet air temperature sensor to approach the target outlet air temperature.

In the automotive air conditioning system, since the flow rate of the non-hot side air that is cooled by the evaporator is controlled by a combination of the amount of air that flows through the primary bypass passageway, which is originally provided, for control by the air mix door and the amount of air that flows through the secondary bypass passageway, which is added, for control by the cold air controlling door, and the cold air controlling door controlling unit controls the opening of the cold air controlling door so that the temperature detected by the outlet air temperature sensor is caused to approach the target outlet air temperature, an accurate control can be implemented by the cold air controlling door, and hence the outlet air temperature can be controlled with good accuracy.

Preferably, the cold air controlling door controlling unit sets the initial opening of the cold air controlling door to 50% of the total opening thereof when a temperature of outside air is in an intermediate area between a high temperature area and a low temperature area. Due to this, since the cold air controlling door can be controlled sufficiently in both directions in which the cold air controlling door is opened and in which the same door is closed after the opening of the air mix door has been set by the air mix door opening setting unit so as to obtain an air conditioned to the target outlet air temperature, the outlet air temperature can be controlled with good accuracy when the outside air temperature resides in the intermediate area between the low temperature area and the high temperature area.

Preferably, the cold air controlling door controlling unit sets the initial opening of the cold air controlling door smaller than 50% of the total opening thereof when a temperature of outside air is in a low temperature area. Due to this, since the cold air controlling door can be controlled sufficiently in the direction in which the cold air controlling door is opened after the opening of the air mix door has been set by the air mix door opening setting unit so as to obtain an air conditioned to the target outlet air temperature, the outlet air temperature can be controlled with good accuracy when the outside air temperature resides in the low temperature area.

Preferably, the cold air controlling door controlling unit sets the initial opening of the cold air controlling door larger than 50% of the total opening thereof when a temperature or outside air is in a high temperature area. Due to this, since the cold air controlling door can be controlled sufficiently in the direction in which the cold air controlling door is closed after the opening of the air mix door has been set by the air mix door opening setting unit so as to obtain an air conditioned to the target outlet air temperature, the outlet air temperature can be controlled with good accuracy when the outside air temperature resides in the high temperature area.

BRIEF DESCRIPTION OF THE DRAWINGS

The present invention may be more readily described with reference to the accompanying drawings.

DETAILED DESCRIPTION OF THE PREFERRED EMBODIMENTS

Hereinafter, a preferred embodiment of the invention will be described based on the accompanying drawings.

Figure 1:
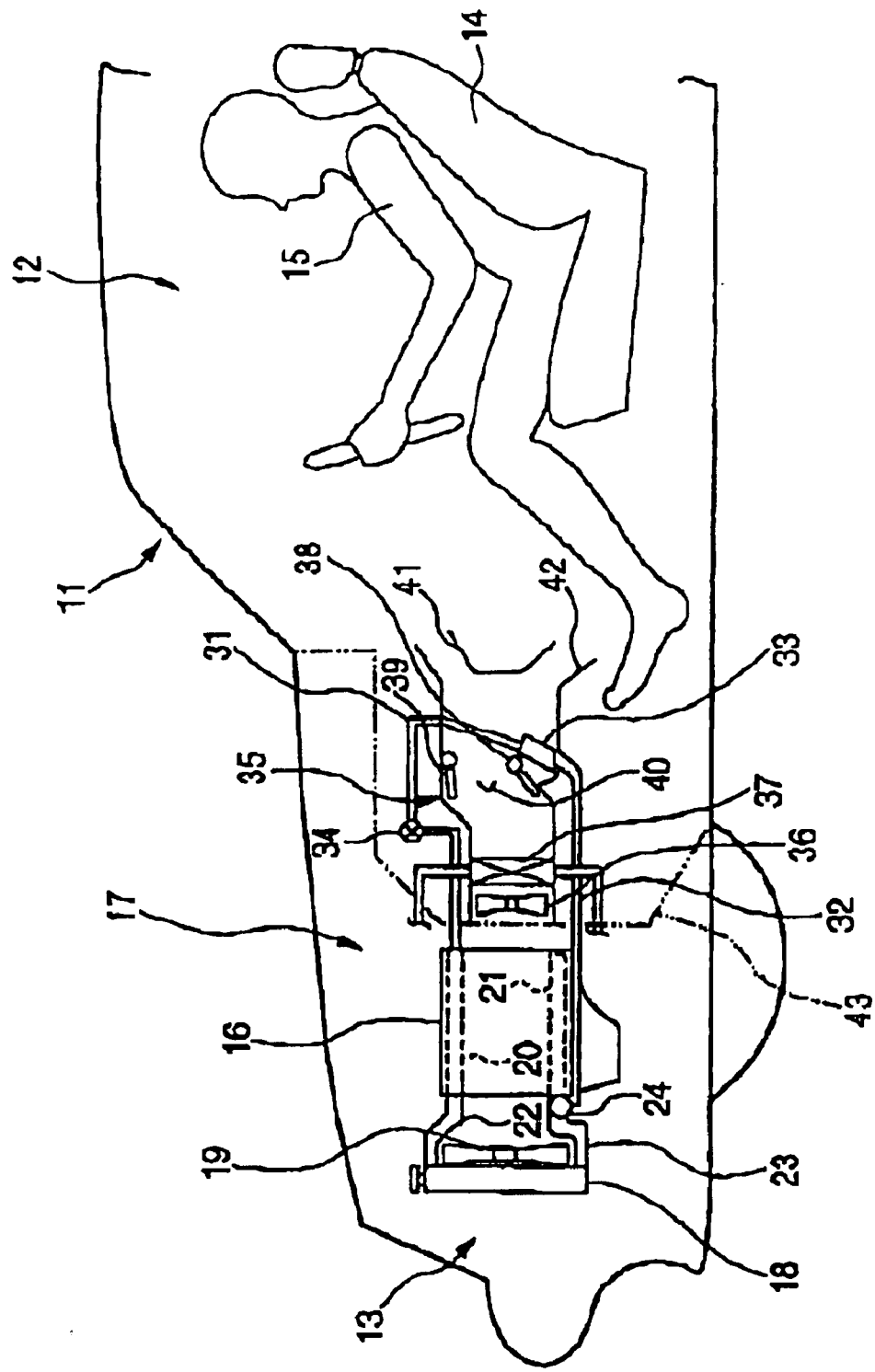
FIG. 1 is a side view schematically showing the construction of a front half portion of an automobile equipped with an automotive air conditioning system according to the invention.

FIG. 1 is a schematic side view of a front-half part of an automobile equipped with an automotive air conditioning system according to the invention. In FIG. 1, portions of an automobile 11 corresponding to a passenger compartment 12 and an engine compartment 13 are shown. A driver 15 is shown as being seated on a seat 14 in the passenger compartment 12. An engine 16 is disposed in the interior of the engine compartment 13. A power transmission mechanism is omitted in the drawing which transmits power outputted from the engine 16.

The construction of an air conditioning system 17 will be described. Firstly, an engine cooling system will be described. A radiator 18 and a radiator fan 19 are disposed in front of (in the drawing, on a left-hand side of) the engine 16. Coolant passageways 20, 21 are defined in the interior of the engine 16, and furthermore, coolant pipings 22, 23 are provided between the engine 16 and the radiator 18. A coolant circulating flow path (an engine coolant circuit) is defined by the coolant passageway 20 in the interior of the engine, the coolant piping 22, the radiator 18, the coolant piping 23 and the coolant passageway 21 which are arranged in that order. The coolant piping 23 situated on an outlet side or the radiator 18 is connected to the coolant passageway 21 for passage of a low-temperature coolant that has been cooled in the radiator 18. The coolant piping 22 situated on an inlet side of the radiator 18 is connected to the coolant passageway 20 for passage of a high-temperature coolant (a hot water) that has been heated in the engine 16. The coolant passageways 20, 21 are connected to each other in the interior of the engine 16. The circulation of coolant that is described above is executed by a coolant pump 24 provided in, for example, the coolant piping 23.

According to the engine cooling system, coolant circulates through the engine coolant circuit, absorbs heat generated in the engine 16 (to thereby become hot water), is then cooled in the radiator 18 so that the temperature thereof is lowered, and is supplied to the engine 16 again. The coolant circulates through the engine coolant circuit in that way, whereby the cooling of the engine 16 is allowed to continue.

The air conditioning system 17 includes a heater core piping 31 connected to the coolant passageway 20 and a heater core piping 32 connected to the coolant passageway 21 via the coolant pump 24. The piping 31 and the piping 32 form a hot water circulation flow path (a heater circuit) by way of a heater core 33. The heater core 33 is a heat exchanger. A water valve 34 is provided in the heater core piping 31 in the circulation flow path. The heater core 33 is disposed in the interior of an air conditioning duct 35.

Provided in the air conditioning duct 35 are, to mention from an upstream side which is situated on the engine compartment 13 side, a blower fan 36, an evaporator (a passenger compartment heat exchanger) 37, an air mix door 38, which can freely be opened and closed, a cold air controlling door 39, which can freely be opened and closed, the aforesaid heater core 33, a branch portion 40 for dividing a passageway portion which bypasses the heater core 33 further into two passageways (a primary bypass passageway 101, a secondary bypass passageway 102) in association with the opening and closing operations of the air mix door 38 and the cold air controlling door 39 and outlets 41, 42. The evaporator 37 cools air sent from the blower fan 36. The outlet 41 is an outlet for vent and the outlet 42 is an outlet for a footwell.

Figure 2:
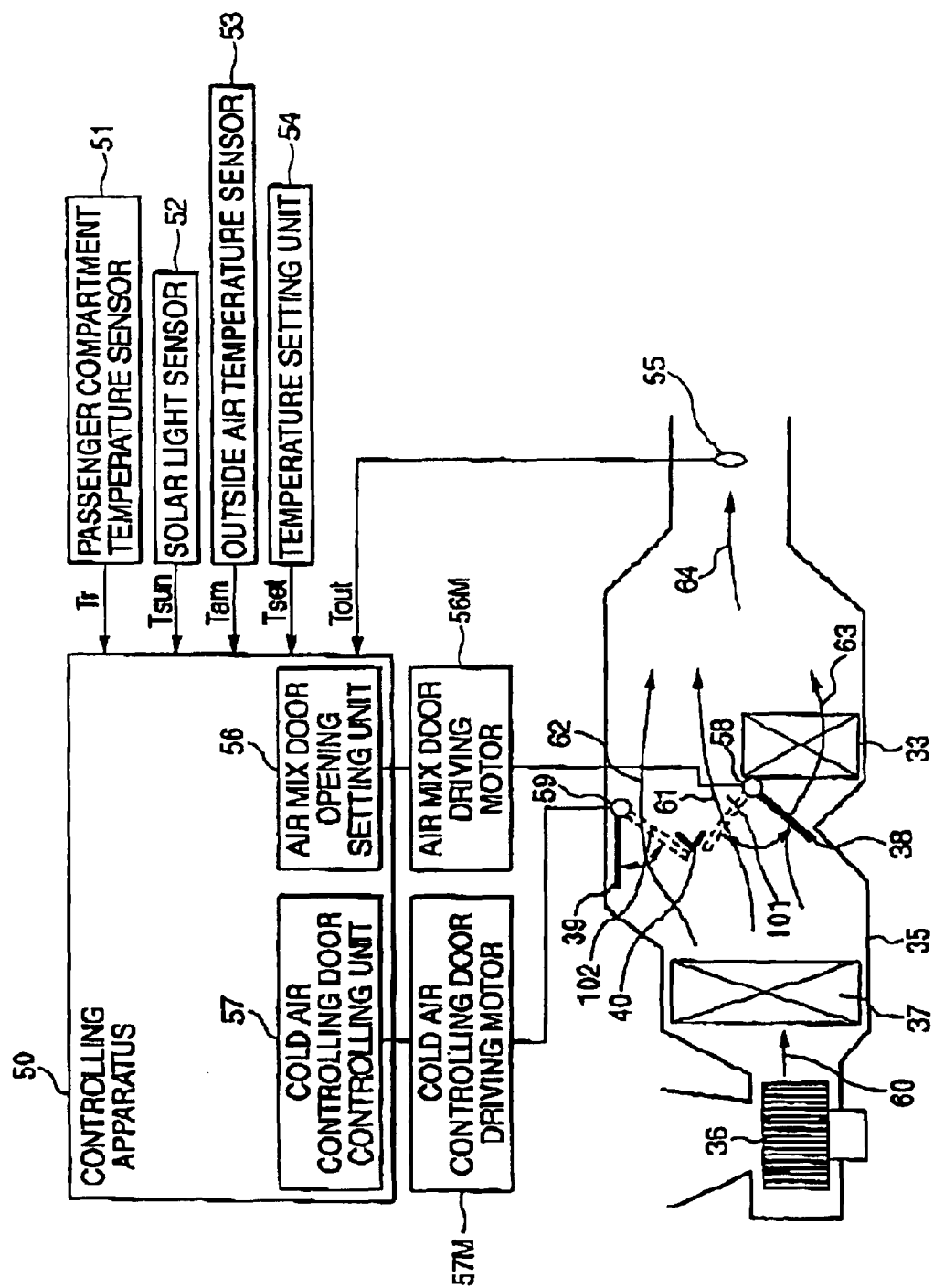
FIG. 2 is a drawing showing the construction of the automotive air conditioning system according to the invention.

In the air conditioning duct 35, air passing through the air conditioning duct 35 is divided by the air mix door 38 into a portion which is allowed to pass through the heater core 33 (a hot side air, an air portion 63 in FIG. 2) and a portion which is caused to bypass the heater core 33 (a non-hot side air, an air portion 61 in the primary bypass passageway 101 in FIG. 2). Furthermore, the secondary bypass passageway 102, which differs from the primary by pass passageway 101, is provided in the non-hot side air (cold air) which is caused to bypass the heater core 33. An air portion 62 flows in the secondary bypass passageway 102. In the secondary bypass passageway 102, the flow rate of the air 62 can be controlled by means of the cold air controlling door 39. The non-hot side air is divided into the air portion 62 whose flow rate Is controlled by the cold air controlling door 39 and the branch portion 40 and the air portion 61 which is caused to bypass the heater core 33 by means of the air mix door 38. Thus, according to the construction of the air conditioning duct 35, air whose temperature is controlled can be supplied into the interior of the passenger compartment 12. In FIG. 1, reference numeral 43 denotes a line indicating a bulkhead which separates the passenger compartment 12 from the engine compartment 13.

According to the air conditioning system 17, hot water in the engine coolant circuit that has been heated by engine heat is caused to flow to the heater circuit for circulation. Air passing through the heater core 33 can be warmed by virtue of this hot water circulation, so that air so warmed can be supplied into passenger compartment 12. Then, a mixing ratio of air that passes through the heater core 33 with air that bypasses the heater core 33 is controlled by appropriately controlling the flow rate of the warmed air by means of the air mix door 38, so that the temperature is controlled. Furthermore, the outlet air temperature is controlled more accurately by finely controlling the flow rate of cold air by means of the cold air controlling door 39 so as to be caused to approach a set temperature.

FIG. 2 is a drawing illustrating the construction or the air conditioning system 17 according to the invention which includes the configuration of a controlling system. The construction of the air conditioning duct 35 is as has been described above, and like reference numerals are imparted to like elements to the elements that have been described with respect to FIG. 1. In FIG. 2, the air conditioning system 17 further includes an outlet air temperature sensor 55 for detecting the temperature of air at the outlet, a rotating mechanism 58 for freely opening and closing the air mix door 38, an air mix door driving motor 56M for changing the opening of the air mix door 38, a rotating mechanism 59 for freely opening and closing the cold air controlling door 39 and a cold air controlling door driving motor 57M for changing the opening or the cold air controlling door 39.

An air mix door opening setting unit 56 for sending a driving command signal to the air mix door driving motor 56M and a cold air controlling door controlling unit 57 for sending a driving command signal to the cold air controlling door driving motor 57M are provided in a controlling apparatus. The controlling apparatus 50 is realized by a computer installed in the automobile 11.

Air 60 sent out from the blower machine 36 is cooled while passing through the evaporator 37 and comes out of the evaporator 37 as a cold air. The air so cooled is then divided depending on the opening of the air mix door 38 into the portion (the hot-side air) 63 which is caused to pass through the heater core 33 and the portions (the non-hot side air) 61, 62 which are caused to bypass the heater core, and the non-hot side air is divided further into the air portion 62 whose flow rate is controlled by the cold air controlling door 39 and the air portion 61 which is caused to bypass the heater core 33 by means of the air mix door 38. The mixing ratio of the hot side air 63 and the non-hot side air (61, 62) is changed depending on the opening position of the air mix door 38. The flow rate of the air portion 62 of the non-hot side air is finely controlled by the cold air controlling door 39.

The opening or the air mix door 38 is determined within a range from an angle at which the passageway which causes air to pass through the heater core 33 is completely closed and an angle at which the passageway which causes air to bypass the heater core 33 is completely closed. The opening of the cold air controlling door 39 is initially held at a preset opening depending on the outside air temperature and is driven within a range from an angle at which the passageway in association with the cold air 62 is completely closed to an angle at which the same passage is completely opened when a fine controlling is required due to the feedback control of the outlet air temperature.

The operation of the air mix door driving motor 56M for changing the opening of the air mix door 38 is controlled by a driving command signal given by the air mix door opening setting unit 56 of the controlling apparatus 50. The operation of the driving motor 57M for changing the opening of the cold air controlling door 39 is controlled by a driving command signal given by the cold air controlling door controlling unit 57 of the controlling apparatus 50.

Inputted Into the controlling apparatus 50 as input signals are Tr (a signal related to the temperature inside the passenger compartment) from a passenger compartment temperature sensor 51, Tsun (a signal related to the amount of solar light entering the passenger compartment) from a solar light sensor 52, Tam (a signal related to the temperature outside the passenger compartment), Tset (a signal related to a temperature set for air inside the passenger compartment) from a temperature setting unit 54, and Tout (a signal related to the temperature of air at the outlet) from the outlet air temperature sensor 55. Tset is a set temperature that is to be set by the driver 15, and Tr, Tsun, Tam and Tout are, respectively, detection signals outputted from the corresponding sensors 51, 52, 53 and 55.

The controlling apparatus 50 into which the aforesaid various types of signals are inputted controls the opening of the air mix door 38 and the opening of the cold air controlling door 39 based on a control flow and a relational repression, which will be described below.

Figure 3:
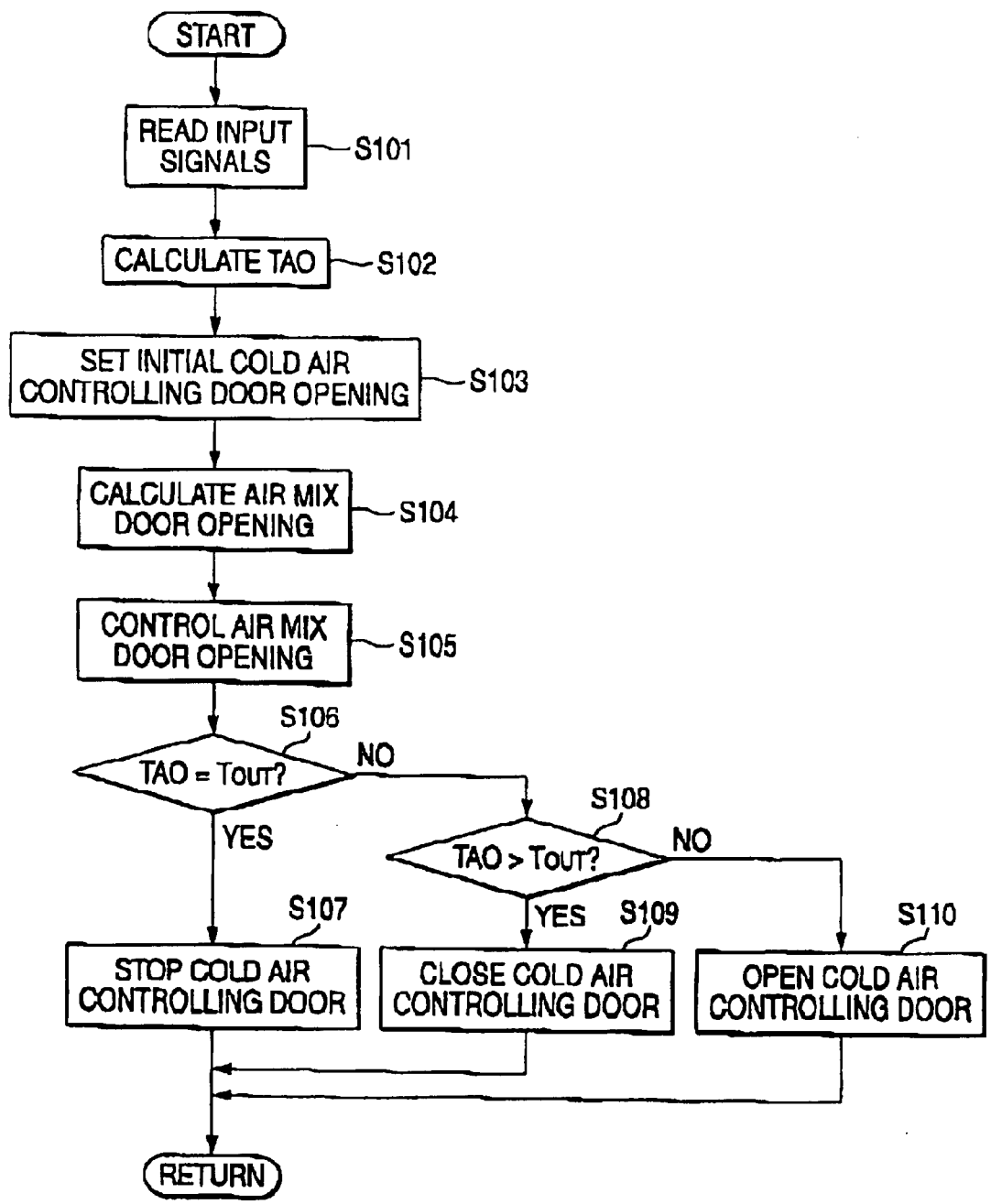
FIG. 3 is a flowchart illustrating a driving control process of an air mix door and a cold air controlling door by the automotive air conditioning system according to the invention.

Next, referring to FIG. 2 and further to FIG. 3, the opening control of the air mix door 38 and the cold air controlling door 39 based on the control by the controlling apparatus 50 will be described. FIG. 3 is a flowchart illustrating how to determine the opening when controlling the opening and closing operation of the air mix door 38 and a feedback control by the cold air controlling door 39.

Various types of input signals are read at an Initial step S101. Here, input signals that are read are Tr, Tsun, Tam, Tset and Tout.

Next, a target outlet air temperature (TAO) is calculated using the aforesaid input signals and based on the following equation (Equation No. 1) (step S102).

$$TAO = Kset*Tset - Kr*Tr - Kam*Tam - Ksun*Tsun + C \quad \text{(Equation No. 1)}$$

where;

Tset is a temperature set for air inside the passenger compartment,

Tr is the temperature of air inside the passenger compartment,

Tam is the temperature of air outside the passenger compartment,

Tsun is the amount of solar light entering the passenger compartment,

Kset, Kr, Kam, Ksu, and C are controlling constants, and

* denotes a symbol for multiplication.

An initial opening for the cold air controlling door 39 is set based on the Tam road at step S101 (step S103). An opening for the air mix door is calculated based on a numerical value of the calculated target outlet air temperature TAO (step S104). The opening of the air mix door 38 is controlled via the air mix door driving motor 56M based on the opening so calculated (step S105).

The opening of the air mix door 38 that has been calculated above is a value that has been calculated on the premise that the cold air controlling door 39 is at the initial opening. Consequently, an air temperature at the outlet that is obtained only from the control of the opening of the air mix door 38 is such as to reside in the vicinity of the target outlet air temperature TAO. This is because the air mix door 38 has the function to divide the air passing through the air conditioning duct into the hot side air 63 which is caused to pass through the heater core 33 and the non-hot side air 61, 62 which is caused to bypass the heater core 33, and the outlet air temperature is caused to approach the target outlet air temperature TAO by the air mix door 38.

Next, the target outlet air temperature TAO is compared with an outlet air temperature Tout detected by the outlet air temperature sensor 55, so that the outlet air temperature is caused to approach the target outlet air temperature TAO by controlling the opening of the cold air controlling door 39. In the event that the target outlet air temperature TAO is equal to the outlet air temperature Tout (step S106), the cold air controlling door 39 is stopped, or with the cold air controlling door 39 being in a stopped state, the stopped state is caused to continue as it is (step S107).

In the event that the target outlet air temperature TAO is different from the outlet air temperature Tout (step S106) in such a manner that the target outlet air temperature TAO is higher than the outlet air temperature Tout (step S108), the opening of the cold air controlling door 39 is controlled in the direction in which the door is closed (step S109). As this occurs, it is preferable to control the opening in accordance with the difference in temperature. In contrast, as a result of the comparison, in the event that the target outlet air temperature TAO is lower than the outlet air temperature Tout (step S110), the opening of the cold air controlling door 39 is controlled in the direction in which the door is opened (step S110). Since the cold air controlling door 39 is in the state in which the door is opened through the predetermined opening at the initial stage, even in the event that the outlet air temperature is higher or lower than the target outlet air temperature, the cold air controlling door 39 can be finely controlled so as to increase or decrease the outlet air temperature by controlling the cold air controlling door in the direction in which the door is close or opened.

While at the step S106, the target outlet air temperature TAO and the outlet air temperature Tout are described as being equal to each other, they may be regarded as being equal within a predetermined range. In this case, when a difference between the target outlet air temperature TAO and the outlet air temperature Tout falls within a predetermined range, the cold air controlling door 39 is stopped, whereby the outlet air temperature Tout is feedback controlled in such a manner as to fall within a predetermined temperature range relative to the target outlet air temperature TAO at all times, and the cold air controlling door 39 is controlled about the initial opening.

Figure 4:
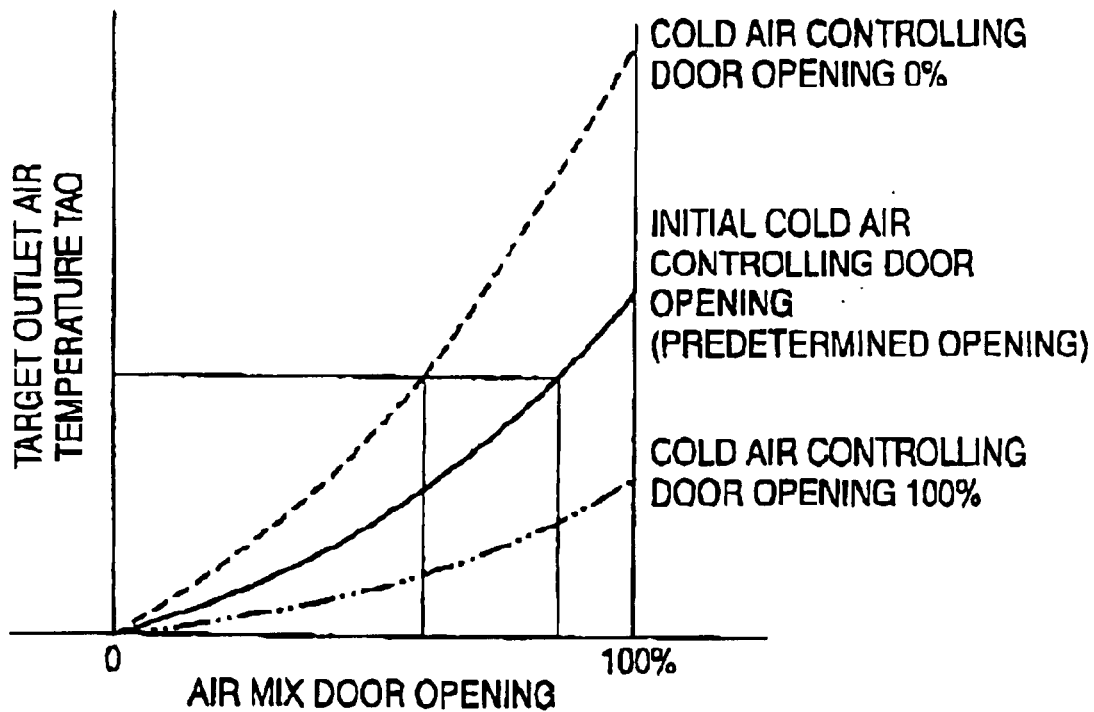
FIG. 4 is a diagram showing a relationship between an air mix door opening and a target outlet air temperature illustrated using the opening of the cold air controlling door as a parameter.

FIG. 4 is a diagram showing a relationship between the air mix door opening (0 to 100%) and the target outlet air temperature TAO illustrated using the initial opening (typically 0%, an arbitrary angle (a predetermined angle), 100%) as a parameter. As shown in FIG. 4, in order to obtain the same target outlet air temperature, the opening of the air mix door 38 becomes larger as the cold air controlling door 39 opens wider. In addition, it is seen that the change in temperature according to the change in the opening of the air mix door becomes smaller as the cold air controlling door opens wider.

Here, it will be described why the initial opening of the cold air controlling door 39 needs to be changed depending on different seasons or the like. In the season like spring or autumn when a hot weather and a cold weather are repeated alternately, since cooling and heating need to be used, there may occur a case where the outlet air temperature becomes higher and lower than the target outlet air temperature. Due to this, the cold air controlling door 39 needs to have an allowance in opening in order to control cold air. In addition, when heating is used as in winter, since the target outlet air temperature needs to be high from the time when the air conditioning system 17 is activated, it is preferable that the Initial opening of the cold air controlling door 39 is small. On the contrary, when cooling is used as in summer, since the target outlet air temperature needs to be low from the time when the air conditioning system 17 is activated, it is preferable that the initial opening of the cold air controlling door 39 is large.

Figure 5:
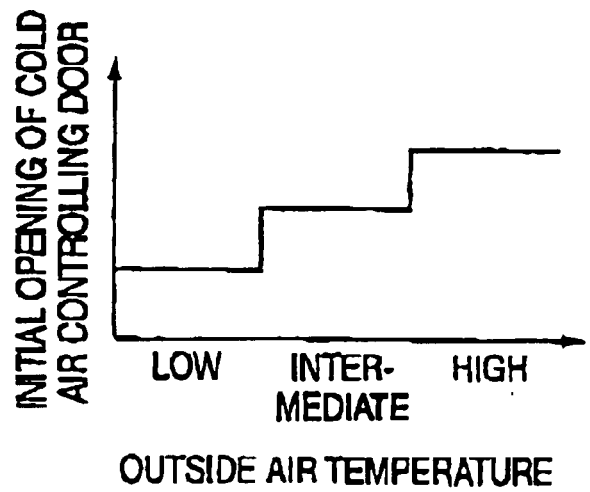
FIG. 5 is a diagram showing a relationship between the outside air temperature and an initial opening of the cold air controlling door.

Next, a case will be described where the initial opening is caused to differ depending on different outside air temperatures. FIG. 5 is a diagram showing a relationship between outside air temperature and the initial opening of the cold air controlling door. When the outside air is in an intermediate area between a low temperature area and a high temperature area, the initial opening of the cold air controlling door is made to be in the order of 50% of the total opening thereof. When the outside air is in the high temperature area or when a season like summer has come, the initial opening of the cold air controlling door is made to be larger than 50%. When the outside air temperature is in the low temperature-area or when a season like winter has come, the initial opening of the cold air controlling door is made to be smaller than 50%.

Next, a relationship between the air mix door opening and the target outlet air temperature TAO will be Illustrated using the opening of the cold air controlling door 39 as a parameter in each of the aforesaid cases, and characteristics of each case will be described.

Figure 6:
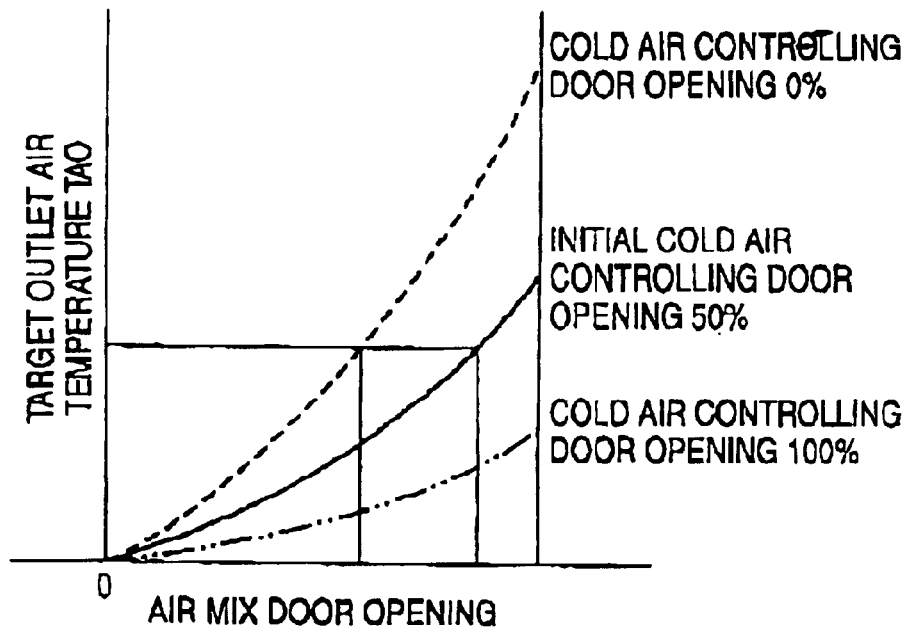
FIG. 6 is a diagram showing a relationship between the air mix door opening and a target outlet air temperature resulting in the event that the initial opening of the cold air controlling door is made to be 50% when the outside air temperature resides in an intermediate area between a high temperature area and a low temperature area.

FIG. 6 is a diagram showing a relationship between the air mix door opening and the target outlet air temperature TAO resulting in the event that the initial opening of the cold air controlling door 39 is made to be 50% when the outside air temperature is in the intermediate area between the low temperature area and the high temperature area. In a season like spring or autumn when a hot weather and a cold weather are repeated alternately with the outside air temperature residing in the intermediate area, since cooling and heating need to be used, there may occur a case where the outlet air temperature becomes higher or lower than the target outlet air temperature TAO. To cope with a condition like this, with the initial opening of the cold air controlling door 39 being set to 50%, the cold air controlling door 39 can be controlled to either a side where the temperature is increased or a side where the temperature is decreased. Consequently, even in a case where the difference between the outlet air temperature and the target outlet air temperature is large due to the control only by the air mix door 38, the cold air controlling door 39 can be feedback controlled so that the outlet air temperature can be caused to approach the target outlet air temperature TAO.

Figure 7:
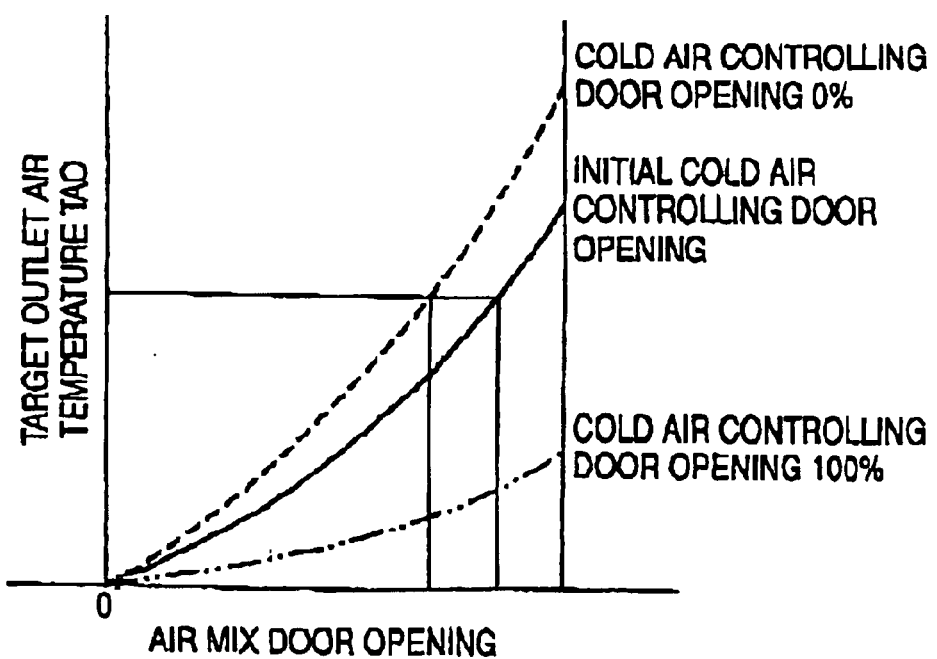
FIG. 7 is a diagram showing a relationship between the air mix door opening and the target outlet air temperature resulting in the event that the initial opening of the cold air controlling door is made to be smaller than 50% when the outside air temperature resides in the low temperature area.

FIG. 7 is a diagram showing a relationship between the air mix door opening and the target outlet air temperature TAO resulting in the event that the initial opening of the cold air controlling door 39 is made to be lower than 50% when the outside air temperature resides in the low temperature area. In the event that heating is used as in winter when the outside air temperature resides in the low temperature area, since the target outlet air temperature needs to high, the initial opening of the cold air controlling door 39 is made to be small.

While heating is implemented in winter, in the event that sunlight hits the solar light sensor suddenly, the target outlet temperature TAO decreases accordingly, and a required control cannot be implemented only by changing the opening of the air mix door 38. This is because, even in the event that the air mix door 38 is controlled, since a passageway downstream of the heater core 33 is heated, the temperature does not decrease immediately. When the outside air temperature resides in the low temperature area, however, since the initial opening of the cold air controlling door 39 is made to be smaller than 50%, the cold air controlling door 39 has a sufficient allowance for controlling cold air in the opening direction. Consequently, even in the aforesaid event, the temperature can be lowered quickly by largely opening the cold air controlling door 39.

Figure 8:
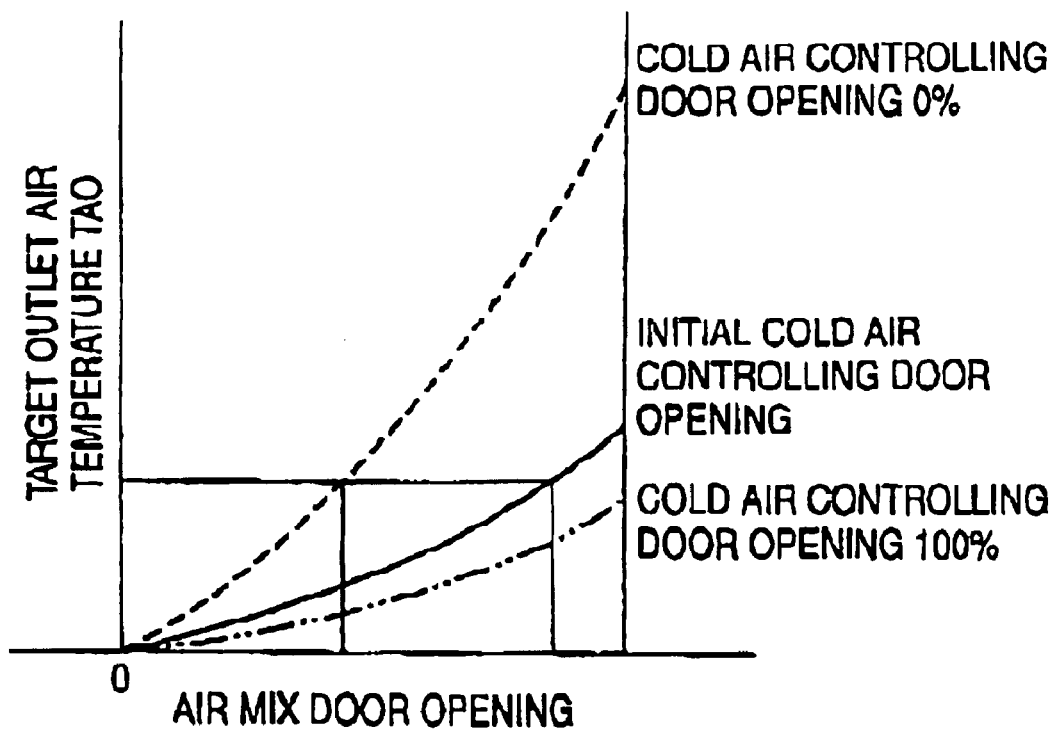
FIG. 8 is a diagram showing a relationship between the air mix door opening and the target outlet air temperature resulting in the event that the initial opening of the cold air controlling door is made to be larger than 50% when the outside air temperature resides in the high temperature area.

FIG. 8 is a diagram showing a relationship between the air mix door opening and the target outlet air temperature TAO resulting in the event that the initial opening of the cold air controlling door 39 is made to be larger than 50% when the outside air temperature resides in the high temperature area. In the event that cooling is used as in summer when the outside air temperature resides in the high temperature area, since the target outlet air temperature needs to low, the initial opening of the cold air controlling door 39 is made to be large.

While cooling is performed in summer, in the event that a vehicle suddenly enters a tunnel while running in sunlight, the target outlet air temperature TAO increases accordingly, there may occur a case where a required control cannot be performed quickly only by controlling the opening of the air mix door 38. This is because even in the event that the air mix door 38 is controlled, since the passageway downstream of the primary bypass passageway 101 is cooled, the temperature cannot increase immediately. When the outside air temperature resides in the high temperature area, however, since the initial opening of the cold air controlling door 39 is made to be larger than 50%, the cold air controlling door 39 has a sufficient allowance for controlling cold wind in the closing direction. Consequently, even in the aforesaid event, the temperature can be increased quickly by largely closing the cold air controlling door 39.

According to the invention, in the automotive air conditioning system, since the amount of the non-hot side air is controlled by the combination or the amounts of air that flows through the primary bypass passageway and the secondary bypass passageway, the extent of temperature change that can be controlled can be reduced, there can be provided an advantage that the temperature of air at the outlet from which air is sent out into the passenger compartment can be controlled with good accuracy.

The constructions, shapes, sizes and positional relationships that have been described in the embodiment are illustrated schematically only to such an extent That the invention can be understood and implemented, and hence they constitute only typical examples. Consequently, the invention is not limited to the embodiment that has been described above and can be modified to various forms without departing from the scope of technical idea claimed under claims of the invention.

The invention can be applied to an automotive air conditioning system in which air passing through the interior of the air conditioning duct is divided into the hot side air which is caused to pass through the heater core and the non-hot side air which is caused to bypass the heater core by the air mix door for use in controlling the outlet air temperature with good accuracy.

What is claimed is:

1. An automotive air conditioning system, comprising:
   an air conditioning duct having an outlet;
   an evaporator that cools air inside the air conditioning duct;
   a beater core that heats air inside the air conditioning duct;
   an air mix door that divides air passing through an interior of the air conditioning duct into a hot side air which is made to pass through the heater core and a non-hot side air which is made to bypass the heater core;
   an outlet air temperature sensor downstream of the evaporator and heater core that detects a temperature of air at the outlet;
   a control unit that is connected to the outlet air temperature sensor;
   a primary bypass passageway bypassing the heater core which is defined by the air mix door;
   a secondary bypass passageway bypassing the heater core in addition to the primary bypass passageway; and
   a cold air controlling door that controls a flow rate of air in the secondary bypass passageway;
   wherein the control unit includes:
      an air mix door opening setting means for setting an opening for the air mix door so as to obtain air conditioned to the target outlet air temperature when the cold air controlling door is opened to an initial opening; and
      a cold air controlling door controlling means for controlling the opening of the cold air controlling door to cause a temperature detected by the outlet air temperature sensor to approach the target outlet air temperature.

2. The automotive air conditioning system as set forth in claim 1,
   wherein the cold air controlling door controlling means sets the initial opening of the cold air controlling door to 50% of the total opening thereof when a temperature of outside air is in an intermediate area between a high temperature area and a low temperature area.

3. The automotive air conditioning system as set forth in claim 1,
   wherein the cold air controlling door controlling means sets the initial opening of the cold air controlling door smaller than 50% of the total opening thereof when a temperature of outside air is in a low temperature area.

4. The automotive air conditioning system as set forth in claim 1, wherein the cold air controlling door controlling means sets the initial opening of the cold air controlling door larger than 50% of the total opening thereof when a temperature of outside air is in a high temperature area.

5. The automotive air conditioning system as set forth in claim 1, wherein the control unit comprising means for performing a feed back control based on the temperature of air at the outlet.

* * * * *